United States Patent
Kuznecov

(10) Patent No.: US 12,466,663 B2
(45) Date of Patent: Nov. 11, 2025

(54) APPARATUS FOR ORIENTING OR ROTATING OBJECTS

(71) Applicant: Deutsche Post AG, Bonn (DE)

(72) Inventor: Viktor Kuznecov, Siegburg (DE)

(73) Assignee: Deutsche Post AG, Bonn (DE)

( * ) Notice: Subject to any disclaimer, the term of this patent is extended or adjusted under 35 U.S.C. 154(b) by 123 days.

(21) Appl. No.: 18/216,032

(22) Filed: Jun. 29, 2023

(65) Prior Publication Data

US 2024/0002170 A1   Jan. 4, 2024

(30) Foreign Application Priority Data

Jul. 1, 2022   (DE) .................. 10 2022 116 481.0

(51) Int. Cl.
| | |
|---|---|
| B65G 43/08 | (2006.01) |
| B65G 13/075 | (2006.01) |
| B65G 47/244 | (2006.01) |
| B65G 47/46 | (2006.01) |

(52) U.S. Cl.
CPC ........... B65G 47/46 (2013.01); B65G 13/075 (2013.01); B65G 43/08 (2013.01); B65G 47/2445 (2013.01)

(58) Field of Classification Search
CPC .. B65G 47/2445; B65G 47/46; B65G 13/075; B65G 43/08
USPC ........................................................ 198/359
See application file for complete search history.

(56) References Cited

U.S. PATENT DOCUMENTS

| | | |
|---|---|---|
| 586,866 A | 7/1897 | Potter |
| 1,321,303 A | 11/1919 | Haldeman |
| 3,552,541 A | 1/1971 | Riggs |
| 3,726,390 A | 4/1973 | Fletcher et al. |
| 4,676,361 A | 6/1987 | Heisler |
| 6,390,766 B1 | 5/2002 | Craig et al. |
| 6,622,846 B1 * | 9/2003 | Dean ...................... B65G 69/24  198/370.09 |
| 6,669,012 B1 | 12/2003 | Yoshida et al. |

(Continued)

FOREIGN PATENT DOCUMENTS

| | | |
|---|---|---|
| CH | 469614 | 3/1969 |
| CH | 469614 A * | 3/1969 |

(Continued)

OTHER PUBLICATIONS

JP 2005041624 A (Year: 2005).*

(Continued)

Primary Examiner — Gene O Crawford
Assistant Examiner — Lester Rushin, III
(74) Attorney, Agent, or Firm — The Webb Law Firm

(57) ABSTRACT

Apparatus for orienting objects, including a conveying apparatus, wherein the conveying apparatus has an inlet for receiving the objects and an outlet and is configured to convey the objects in a conveying direction. In this case, the conveying apparatus has an orienting apparatus which at least partially extends along the conveying direction. The orienting apparatus has a first portion and a second portion, wherein the first portion and the second portion are arranged next to one another along the conveying direction. At least one of the first portion and the second portion is configured as a roller conveyor. The objects are subjected to a different acceleration/braking action by the first portion and the second portion for orientation purposes.

11 Claims, 5 Drawing Sheets

(56) References Cited

U.S. PATENT DOCUMENTS

| | | | |
|---|---|---|---|
| 6,694,220 B1 | 2/2004 | Tanz | |
| 6,981,580 B2 | 1/2006 | Meyer | |
| 7,073,651 B2 * | 7/2006 | Costanzo | B65G 13/12 198/359 |
| 8,205,738 B1 | 6/2012 | Fourney | |
| 9,592,983 B2 * | 3/2017 | Costanzo | B07C 3/00 |
| 10,899,551 B1 | 1/2021 | Fuller et al. | |
| 2001/0023813 A1 | 9/2001 | Van Den Goor | |
| 2002/0046923 A1 | 4/2002 | Herubel et al. | |
| 2003/0234155 A1 | 12/2003 | Kanamori et al. | |
| 2004/0223839 A1 | 11/2004 | Simkowski | |
| 2005/0023105 A1 | 2/2005 | Costanzo et al. | |
| 2006/0151296 A1 | 7/2006 | Halang | |
| 2006/0163035 A1 | 7/2006 | Pahud | |
| 2007/0074954 A1 | 4/2007 | Neville | |
| 2009/0120764 A1 | 5/2009 | Hysell et al. | |
| 2009/0127074 A1 | 5/2009 | Cavallo et al. | |
| 2009/0200139 A1 | 8/2009 | Kissee et al. | |
| 2010/0108468 A1 | 5/2010 | Fourney | |
| 2012/0228085 A1 | 9/2012 | Sjögren et al. | |
| 2013/0220775 A1 | 8/2013 | Faist et al. | |
| 2013/0325937 A1 * | 12/2013 | Barclay | H04L 67/12 709/203 |
| 2014/0014468 A1 | 1/2014 | Pilarz et al. | |
| 2014/0374216 A1 | 12/2014 | Pierson et al. | |
| 2015/0360869 A1 | 12/2015 | Bastian, II et al. | |
| 2016/0200525 A1 | 7/2016 | Coullery | |
| 2016/0325937 A1 * | 11/2016 | Bastian, II | B65G 43/08 |
| 2017/0334661 A1 | 11/2017 | Stefanko et al. | |
| 2018/0057271 A1 | 3/2018 | Vitalini | |
| 2018/0127213 A1 | 5/2018 | Wargo et al. | |
| 2018/0215556 A1 | 8/2018 | Lee | |
| 2021/0061576 A1 | 3/2021 | Stuhlmann et al. | |
| 2021/0061578 A1 | 3/2021 | Loose | |

FOREIGN PATENT DOCUMENTS

| | | |
|---|---|---|
| CN | 107284747 A | 10/2017 |
| CN | 109107905 A | 1/2019 |
| CN | 109515844 A | 3/2019 |
| CN | 208828583 U | 5/2019 |
| CN | 112958475 A | 6/2021 |
| DE | 1756233 | 4/1970 |
| DE | 2434362 A1 | 1/1976 |
| DE | 3245981 A1 | 6/1984 |
| DE | 9318559 U1 | 2/1994 |
| DE | 4409780 A1 | 9/1995 |
| DE | 4418359 A1 | 11/1995 |
| DE | 20214860 U1 | 3/2003 |
| DE | 202005015544 U1 | 2/2007 |
| DE | 102006024657 A1 | 1/2008 |
| DE | 102011116535 A1 | 4/2013 |
| DE | 102013212317 A1 | 12/2014 |
| DE | 102018130300 A1 | 6/2020 |
| EP | 1180484 A2 | 2/2002 |
| EP | 1498370 A1 | 1/2005 |
| EP | 2969865 B1 | 4/2017 |
| EP | 3326940 A2 | 5/2018 |
| EP | 3653546 A1 | 5/2020 |
| EP | 3763641 A1 | 1/2021 |
| EP | 3548407 B1 | 8/2021 |
| EP | 3964460 A1 | 3/2022 |
| EP | 1205410 A1 | 5/2022 |
| GB | 1156756 | 7/1969 |
| GB | 2205078 A | 11/1988 |
| GB | 2224986 A | 5/1990 |
| GB | 2434569 A | 8/2007 |
| IT | MI20102113 | 5/2012 |
| JP | S59138519 A | 8/1984 |
| JP | S6164621 A | 4/1986 |
| JP | H04112124 A | 4/1992 |
| JP | H11322059 A | 11/1999 |
| JP | 2005067863 A | 3/2005 |
| JP | 2007308264 A | 11/2007 |
| JP | 2010100398 A | 5/2010 |
| JP | 4883611 B2 | 2/2012 |
| JP | 2016060614 A | 4/2016 |
| WO | 0037187 A1 | 6/2000 |
| WO | 2004039706 A1 | 5/2004 |
| WO | 2006002156 A1 | 1/2006 |
| WO | 2008075319 A2 | 6/2008 |
| WO | 2011117897 A1 | 9/2011 |
| WO | 2014154333 A1 | 10/2014 |
| WO | 2015112019 A1 | 7/2015 |
| WO | 2017192817 A1 | 11/2017 |
| WO | 2017201146 A1 | 11/2017 |
| WO | 2018106104 A1 | 6/2018 |
| WO | 2020130823 A1 | 6/2020 |
| WO | 2020242360 A1 | 12/2020 |

OTHER PUBLICATIONS

Ep4134337 (Year: 2021).*
CN102381559 (Year: 2012).*
WO2019016591 (Year: 2018).*

* cited by examiner

APPARATUS FOR ORIENTING OR ROTATING OBJECTS

CROSS-REFERENCE TO RELATED APPLICATION

This application claims priority to German Patent Application No. 10 2022 116 481.0 filed Jul. 1, 2022, the disclosure of which is hereby incorporated by reference in its entirety.

BACKGROUND OF THE INVENTION

Field of the Invention

The present invention relates to an apparatus for conveying objects such as packages, parcels, cargo or consignments. In particular, the present invention relates to an apparatus which may be part of a sorter for sorting the objects.

Description of Related Art

As the number of consignments and goods to be transported increases in logistics, the demand on the sorting thereof also increases. The objects are usually sorted in so-called sorters. Here, the objects are sorted and assigned individual so-called end locations. It is then possible for further transport, transloading or renewed sorting to be effected for the objects of a respective end location. In order to, however, increase the granularity of the sorting in the case of an increasing number of objects to be transported, it may be necessary to also increase the number of end locations. However, this necessitates an increased space requirement. At the same time, the dimensions of these end locations cannot be selected to be as small as desired, since the dimension of the end locations is oriented to the size of the objects.

An additional factor particularly when sorting packages is that the individual packages can be of very different form and can thus for example have a weight of between 10 g and 32 kg. The shape and size also varies in a large range of for example between 5×5×0.5 cm to 60×60×120 cm. In addition to the customary cuboid packages, which mostly consist of corrugated board, use is also increasingly being made of packing bags as secondary packaging of the packages, as a result of which there is a further variability in the transport behavior of the packages.

At the same time, in a sorter, the movement speed of the packages should be selected to be as high as possible, in order to obtain the highest possible throughput of packages. However, this leads to further problems in particular for heavy packages, since these have to be decelerated effectively in order to avoid impacts which could damage the heavy packages. By contrast, it is possible or necessary for lightweight packages and in particular packing bags to be actively conveyed, since these are possibly even too light to be able to slide for example over roller tracks based on their weight force.

In customary sorters, the sorting of the objects involves said objects being transported along a first conveying direction on a first conveying apparatus and then being ejected from this first conveying apparatus into individual end locations. There is the risk here that when the objects are ejected into the respective end location, the objects tilt and become stuck. This blocks the respective end locations. This requires manual intervention in the end locations, which reduces the sorting efficiency of the sorter and possibly represents a hazard for the operating personnel, since this manual intervention is usually effected during ongoing operation. The probability of tilting is also increased during the transition from the first conveying apparatus and the second conveying apparatus; the second conveying apparatuses configured as end location are of narrow configuration, in order to provide an increased number of these end locations.

SUMMARY OF THE INVENTION

It is thus an object of the present invention to provide an apparatus for conveying objects in which tilting/jamming of the objects is prevented and which can be of compact configuration.

The object is achieved by means of an apparatus as described herein and a sorter as described herein.

The apparatus according to the invention for orienting or rotating objects comprises a conveying apparatus, wherein the conveying apparatus has an inlet for receiving the objects and an outlet and is configured to convey the objects in a conveying direction. Here, the objects may for example be packages, parcels, cargo, consignments or the like. The invention is not limited to a particular type of the objects. Furthermore, the conveying apparatus according to the invention has an orienting apparatus which at least partially extends along the conveying direction. The orienting apparatus has a first portion and a second portion, wherein the first portion and the second portion are arranged next to one another along the conveying direction. In other words, the first portion and the second portion are arranged one behind the other in a direction perpendicular to the conveying direction. In this case, at least one of the first portion and the second portion is configured as a roller conveyor and thus has in particular a multiplicity of conveying elements, such as rollers (configured as a roller track), balls (configured for example as a roller conveyor), rolls or the like. Furthermore, the first portion and the second portion are configured to transmit a different acceleration or braking action to the objects for the purpose of orienting the objects. Thus, that part of the object which is conveyed via the first portion is decelerated or accelerated differently to that part of the same object which is conveyed via the at least second portion. This rotates the object for orientation purposes. The objects are thus oriented or rotated by the orienting apparatus. If, for example, the objects have a width which is smaller than a length of the objects, the orienting apparatus makes it possible to ensure that the object is rotated such that the width is oriented perpendicularly with respect to the conveying direction. In this way, the width of the conveying apparatus, which conforms to the maximum width of the objects to be conveyed, can be reduced, with the result that the space requirement of the conveying apparatus can be reduced. At the same time, the orienting operation ensures that tilting of the object is prevented during the transition of the object into the conveying apparatus. Thus, tilting is prevented in the conveying apparatus by the orienting apparatus, as a result of which manual interventions in the sorter can be reduced.

A planar and in particular common conveying surface is preferably formed by the first portion and the second portion. To this end, in particular the first portion and the second portion are arranged at the same height and without a height offset. It is thus possible for an object which is moved via the first portion and the second portion to come into as full-area contact as possible with the first portion and/or the second portion, such that the corresponding acceleration and/or braking action of the respective portion are effectively transmitted to the object.

Preferably, for orientation purposes, the object is moved via the first portion and simultaneously via the second portion and comes into contact therewith, such that one part of the object is subjected to the acceleration or braking action of the first portion and another part of the object is subjected to the acceleration or braking action of the second portion. In this way, different parts of the object are accelerated/braked differently, which leads to the object being rotated and oriented.

Preferably, the braking action or the acceleration of the first portion and/or of the second portion is effected in a movement direction/conveying direction of the conveying apparatus and in particular not in a movement direction/conveying direction of a main conveying apparatus of the sorter. Thus, in the case that the conveying apparatus is configured as a chute, the gravitational movement along the chute and the braking action or acceleration of the first portion and/or of the second portion for orientation or rotation of the object overlap.

The objects preferably have a weight of between 10 g and 32 kg. As an alternative or in addition thereto, the objects have a maximum width of up to 600 mm and/or a maximum length of up to 1200 mm. Here and in the following text, the smaller of these dimensions is referred to as width and the larger of these dimensions is referred to as length, with the result that the length of an object is always equal to or greater than the width of the object.

The orienting apparatus is preferably configured to orient objects with different weight and/or different dimensions.

Preferably, at the inlet, the length of the object is oriented substantially perpendicularly with respect to the conveying direction and the width of the object is oriented along the conveying direction, wherein the orienting apparatus is configured in such a way as to orient the object such that the length of the object is oriented along the conveying direction downstream of the orienting apparatus.

The width of the conveying apparatus is preferably less than 1000 mm, preferably less than 800 mm and particularly preferably less than 650 mm. As an alternative or in addition thereto, the width of the conveying apparatus is less than the maximum length of the objects. In this case, the width of the conveying apparatus refers to the dimension of the conveying apparatus perpendicular to the second conveying direction. This may in particular be the minimum width of the second conveying apparatus. It is thus possible for the conveying apparatus to have a changing width, which reduces for example proceeding from the inlet in order to ensure an optimal transition of the objects into the conveying apparatus.

A boundary line may preferably be arranged between the first portion and the second portion along the conveying direction. As an alternative, the boundary line may differ from the conveying direction, such that the first portion and/or the second portion changes along the conveying direction.

Preferably, the first portion and the second portion have the same width or different widths (that is to say in one dimension of the portions) and in particular the same size or different sizes (that is to say with regard to their area).

The orienting apparatus is preferably arranged directly at the inlet of the second conveying apparatus. As an alternative thereto, the orienting apparatus is arranged within the conveying apparatus or at the end thereof.

The orienting apparatus is preferably configured to orient the objects during a continuous movement of the objects in the conveying direction. In particular, the objects are not decelerated to a standstill by the orienting apparatus. This makes it possible to orient the objects in a particularly rapid manner and to thus achieve a high throughput of objects on the apparatus according to the invention. This is in particular achieved by virtue of the first portion and/or the second portion being configured as a roller conveyor, and thus a movement of the objects in the conveying direction continuing to be effected during the orientation.

Preferably, the roller conveyor has a drive for generating the acceleration or braking action. To this end, the drive can be coupled to the conveying elements of the roller track and can set them in rotation. In particular, the conveying speed of the roller track can be adapted by way of the drive. In this case, only one conveying element of the roller track, a plurality of the conveying elements of the roller track or all the conveying elements of the roller track may be coupled to the drive. Furthermore, a single drive may be provided which drives all the conveying elements of the roller track together and thus generates a rotation at an identical speed of the conveying elements. As an alternative thereto, at least one conveying element of the roller conveyor has a dedicated drive, such that the rotational speed of the conveying elements of the roller conveyor can be selected independently of one another. By way of example, conveying elements closer to the inlet of the conveying apparatus are moved more rapidly by a first drive than conveying elements closer to the outlet of the conveying apparatus by a second drive, such that the speed of the objects can be reduced along the conveying apparatus. It goes without saying that this should be understood as merely exemplary, and therefore the situation may also be exactly inverted.

Preferably, the roller conveyor has a braking apparatus for braking the rotation of the conveying elements of the roller conveyor. In this case, the rolling resistance of the roller track is changed by means of the braking apparatus for the purpose of generating the braking action. In particular, if the conveying elements of the roller conveyor are set in rotation solely by the movement of the objects, the conveying elements can then be braked by means of the braking apparatus. Preferably, the braking apparatus may be of static configuration, i.e. properties of the conveying elements or of the roller conveyor can be selected in such a way that an increased rolling resistance of the roller conveyor is permanently present. This may for example be achieved by way of an increase in the weights of the conveying elements of the roller conveyor, liquid filling of the rollers or by way of a friction element which brakes the rotation of the conveying elements and which, in this way, generates the rolling resistance of the roller conveyor. As an alternative thereto, the braking apparatus is a dynamically settable braking apparatus, which is changeable. To this end, it is for example possible to provide a braking element which may be configured in particular as an eddy-current brake, a fluid brake or a changeable friction element. In this case, the braking action of the braking element can be changed for individual objects or can be adapted to the respective application or the objects to be expected.

Preferably, the orienting apparatus is configured to adapt the acceleration or braking action of the first portion and/or of the second portion in dependence on one or more of the size of the object, the speed of the object, in particular at the inlet of the conveying apparatus, and the weight of the object. It is thus possible for the orienting apparatus to be controlled in such a way that the orientation is controlled in dependence on the weight, the size and/or the speed of the object, in order to thus ensure an optimal orientation of the objects.

Preferably, the first portion and the second portion are configured as a roller conveyor. The first portion and the second portion are thus embodied as independent roller conveyors which have conveying elements that can be moved independently of one another and transmit a different acceleration or braking action to the objects for the purpose of orienting the objects.

Preferably, the respectively other portion is configured as a sliding surface, an aero surface (also referred to as vacuum surface, air sheet/plate or the like) or a conveyor belt. Thus, if the first portion is configured as a roller conveyor, the second portion may be configured as a sliding surface, an aero surface or a conveyor belt. By contrast, however, if the second portion is configured as a roller conveyor, the first portion may be configured as a sliding surface, an aero surface or a conveyor belt.

Preferably, the first portion or second portion is formed as a conveyor belt or belt conveyor. Here, the movement speed of the conveyor belt in the first portion or in the second portion can be selected accordingly. In particular, the conveying direction of the conveyor belt in the first portion or in the second portion may be selected counter to the conveying direction, in order to thus generate braking. Particularly in the case that the conveying apparatus is configured as a chute, it is for example possible for the object to be moved substantially by the gravitational force, as a result of which the conveyor belt is merely provided to ensure a corresponding orientation of the object.

Preferably, the first portion or the second portion is formed as a sliding surface. Here, it is a passive orienting apparatus, which requires no activation and thus is of particularly simple and cost-effective construction. In this regard, the friction resistance of the first portion or of the second portion may be selected in such a way that, on account of the friction of the object with the sliding surface of the first portion or of the second portion, a different braking action is generated for the purpose of orienting the object.

Preferably, the first portion or the second portion is formed as an aero surface, wherein the aero surface has a multiplicity of openings, wherein a positive pressure can be applied to the openings in order to generate an air cushion under an object or a negative pressure can be applied thereto in order to press/suction the object onto the aero surface. When an air cushion is generated under the object, the friction resistance of the object over the aero surface is thus reduced, as a result of which the braking action on account of the friction with the aero surface is reduced. By contrast, when a negative pressure is applied to the openings in the aero surface, the object is suctioned onto the aero surface, as a result of which the friction between the object and the aero surface is increased so as to increase the braking action. Targeted actuation of the first portion or of the second portion thus makes it possible to adapt the sliding properties of the objects and achieve a targeted orientation.

The conveying apparatus is preferably a chute. Here, the conveying apparatus is inclined in relation to the horizontal, such that a movement of the objects in the direction of the conveying direction is effected substantially by way of the weight force thereof or results from an initial speed, for example based on an ejection speed of the object into the apparatus through a sorter. However, this is not necessarily limited to a sliding movement, but rather also comprises other forms which make a movement of the objects on account of their weight force possible, such as roller conveyors or the like.

Preferably, at the inlet of the conveying apparatus, the object has a movement component which is substantially perpendicular to the conveying direction of the conveying apparatus. In the application, the objects are thus deflected or ejected into the apparatus of the present invention and thus carry a movement component which does not correspond to the conveying direction of the conveying apparatus. In this case, the first portion of higher acceleration or lower braking action is arranged behind the second portion along this movement component. One of the following applies in this case to the relationship between the braking actions and/or accelerations of the first portion and of the second portion:

the first portion has a first braking action and the second portion has a second acceleration;

the first portion has a first acceleration and the second portion has a second acceleration, the first acceleration being greater than the second acceleration; or the first portion has a first braking action and the second portion has a second braking action, the first braking action being smaller than the second braking action.

Thus, a rotation of the objects at the inlet into the conveying apparatus is always effected by the first portion and the second portion of the orienting apparatus. In this case, it is possible for an acceleration or braking of the object or different parts of the objects to be effected simultaneously. The orientation can prevent tilting of the object during the transition into the conveying apparatus. At the same time, the object can be oriented in such a way that the width thereof is oriented in the width direction of the conveying apparatus, and thus the required width of the conveying apparatus can be reduced.

Preferably, the orienting apparatus has a multiplicity of portions arranged next to one another, wherein at least two of these portions are configured as a first portion and a second portion as described above.

Furthermore, the present invention relates to a sorter for sorting objects, the objects in particular being packages, parcels, cargo or consignments. Such a sorter is a logistical sorting and distribution system. In this case, the sorter has a first conveying apparatus and at least one second conveying apparatus, wherein the second conveying apparatus branches off from the first conveying apparatus. The second conveying apparatus may in this case be configured as the end location of the sorter. In this case, the second conveying apparatus is configured according to the apparatus described above. In particular, the first conveying apparatus conveys the objects in a first conveying direction and the second conveying apparatus conveys the objects in a second conveying direction, wherein the first conveying direction differs from the second conveying direction. In particular, the first portion is arranged behind the second portion in the direction of the first conveying direction.

Preferably, the second conveying apparatus is arranged in a substantially perpendicular or inclined manner with respect to the first conveying apparatus. In this way, the second conveying direction is also substantially perpendicular with respect to the first conveying direction or correspondingly inclined. In particular, if the second conveying apparatus is arranged in an inclined manner with respect to the first conveying apparatus, the angle enclosed between the first conveying direction and the second conveying direction is 90° or less, wherein the first conveying direction furthermore differs from the second conveying direction.

Preferably, the sorter has a multiplicity of second conveying apparatuses which branch off from the first conveying apparatus on one side or on both sides. The second conveying apparatuses may in this case be configured as the end locations of the sorter. In this case, the second conveying apparatuses may be of identical or different configuration. In particular, the sorter has more than one second conveying apparatus which is configured according to the apparatus described above. Preferably, all the second conveying apparatuses of the sorter are configured according to the apparatus described above.

BRIEF DESCRIPTION OF THE INVENTION

The invention will be explained in more detail below on the basis of preferred embodiments with reference to the appended drawings.

DESCRIPTION OF THE INVENTION

The apparatus 10 according to the invention has a first conveying apparatus 12 which conveys an object 16 along a first conveying direction 14. The object 16 may for example be a package, a parcel, a piece of cargo or the like. Preferably, the first conveying apparatus 12 is a conveyor belt or a tilt tray conveyor.

Figure 1:
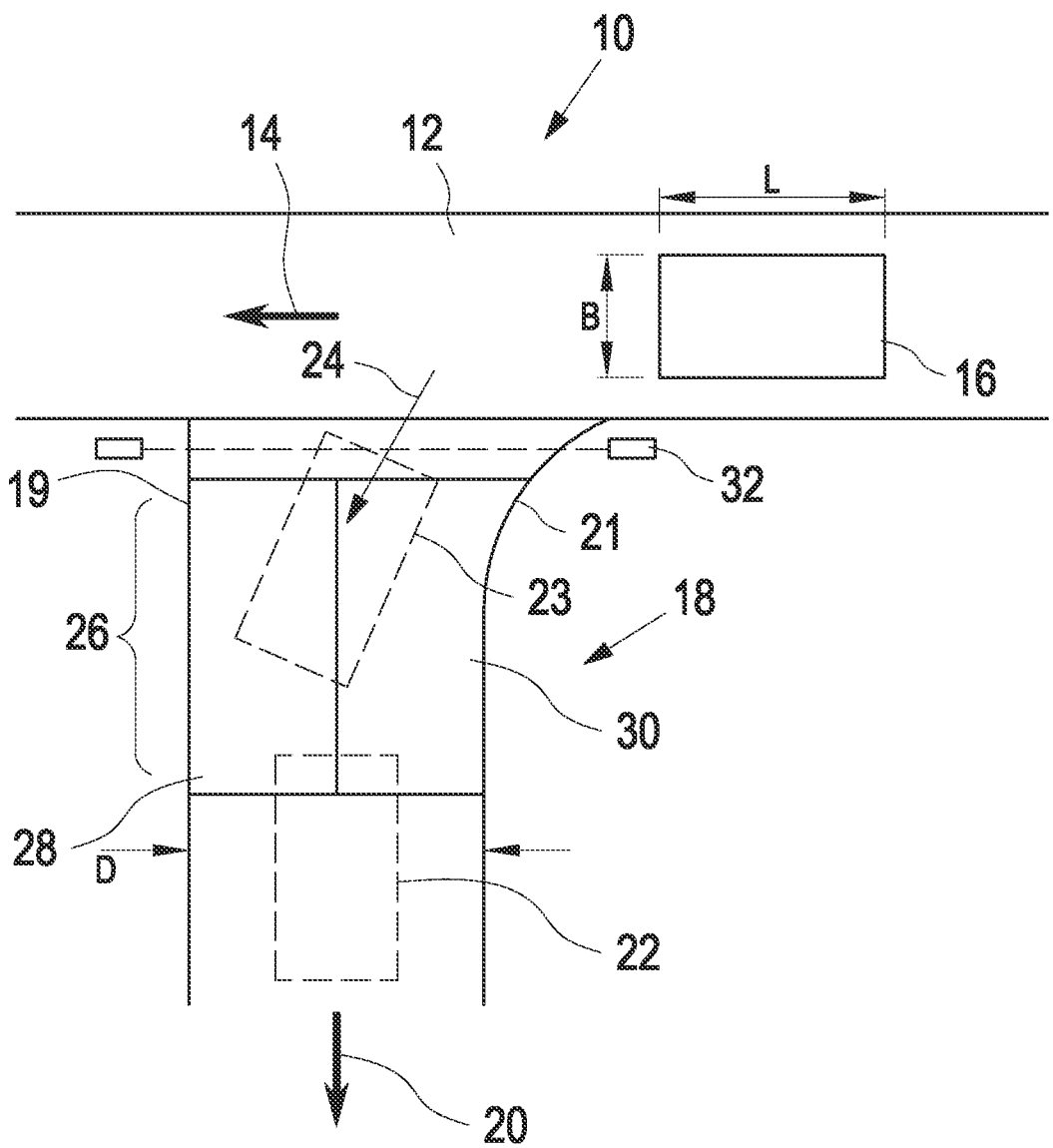
FIG. 1 shows a schematic illustration of the present invention.

In the example in FIG. 1, the object 16 has a width B and a length L. There, in the example in FIG. 1, the object 16 is oriented with its length L along the first conveying direction 14. As an alternative, the object 16 may be oriented on the first conveying apparatus 12 with its width B along the first conveying direction 14.

Furthermore, the apparatus 10 has at least one second conveying apparatus 18. The second conveying apparatus 18 branches off from the first conveying apparatus 12. In the example in FIG. 1, the second conveying apparatus 18 branches off from the first conveying apparatus 12 in a substantially perpendicular manner. Other angles between the first conveying apparatus 12 and the second conveying apparatus 18 are also possible. Furthermore, in the example in FIG. 1, only one second conveying apparatus 18 is shown. However, the apparatus 10 may have a multiplicity of second conveying apparatuses 18 which branch off along the first conveying direction 14 on one or both sides of the first conveying apparatus 12. In this case, the number of second conveying apparatuses is limited by the width thereof and in particular the maximum width D thereof which, in the example in FIG. 1, is present directly at the input or the transition from the first conveying apparatus 12 to the second conveying apparatus 18. In this case, the second conveying apparatus 18 may have a tapering portion 21 which guides ejected objects. The second conveying apparatus 18 is in this case configured to convey an object 22 in a second conveying direction 20. The object 16, which is conveyed by the first conveying apparatus, may for example be ejected into the second conveying apparatus 18 and then be transported by the second conveying apparatus 18. In particular, the second conveying apparatus is a chute, such that the object 16 which is ejected into the second conveying apparatus 18 moves along the second conveying apparatus 18 substantially due to its weight force. An additional movement component may be present as a result of the ejection speed of the object from the first conveying apparatus onto the second conveying apparatus.

In this case, the objects 16 may be very different and for example have a weight of between 10 g and 32 kg. As an alternative or in addition thereto, the objects 16 may have a maximum width of up to 600 mm and/or a maximum length of up to 1200 mm. In this case, the orienting apparatus 26 is in particular configured to orient objects 16 with different weight and/or different dimensions and different starting positions/orientations on the first conveying apparatus.

In particular, if the second conveying apparatus 18 branches off from the first conveying apparatus 12 in a substantially perpendicular manner, the object 16 may, on account of its dimensions, tilt during the transition from the first conveying apparatus 12 to the second conveying apparatus 18. This is the case in particular if the length L of the object 16 is greater than the width D of the second conveying apparatus. In particular, the width D of the second conveying apparatus 18 is less than 1000 mm, preferably less than 800 mm and particularly preferably less than 650 mm. As an alternative or in addition thereto, the width D of the second conveying apparatus 18 is less than the maximum length L of the objects 16.

For orientation or rotation of the objects 16, the second conveying apparatus 18 has an orienting apparatus 26. If the object 16 is ejected from the first conveying apparatus 12 into the second conveying apparatus 18, the object 16 is oriented or rotated in accordance with the arrow 24 by the orienting apparatus 26. This is illustrated in FIG. 1 by the rotated object 23, which is rotated into the second conveying apparatus 18. Since the width B of the object 16 is smaller than the length L, it is possible, by way of the suitable orientation of the object during the transition from the first conveying apparatus 12 into the second conveying apparatus 18, for the object to be oriented in such a way that the width B is perpendicular to the second conveying direction 20. In this way, the necessary space requirement for the second conveying apparatuses 18 can be reduced and, at the same time, due to the optimized orientation of the objects 16 by the orienting apparatus 26, tilting of the objects and thus blocking of the second conveying apparatus 18 during the transition from the first conveying apparatus 12 to the second conveying apparatus 18 can be prevented.

In this case, the orientation of the objects 16 can be effected by the orienting apparatus in dependence on the size of the object 16, the weight of the object 16, the speed of the object on the first conveying apparatus 12 and/or the position of the object on the first conveying apparatus. It is not only possible to achieve an optimum orientation of the object along the second conveying direction 20 in this way. It is also possible to avoid excessively hard striking against a side wall 19 of the second conveying apparatus by way of suitable braking or deflection in the direction of the second conveying direction 20. At the same time, in particular in the case of lightweight objects, stalling within the second conveying apparatus 18 can be avoided, which can occur in particular if the second conveying apparatus 18 is configured as a chute and the objects are particularly lightweight objects such as packing bags. In this regard, the orienting apparatus 26 may be configured to accelerate the objects and thus provide active conveyance in particular of the lightweight objects.

FIG. 1 illustrates a light barrier 32, which detects an object 16 which is ejected into the second conveying apparatus 18. As soon as such an object is detected by the light barrier 32, the object can be oriented by means of the orienting apparatus 26. In this case, the light barrier 32 is illustrated merely in exemplary fashion. Further sensors or alternative sensors may be used to determine the presence of an object, the size of the object, the weight of the object, the position and orientation of the object on the first conveying apparatus and/or the speed of the object on the first conveying apparatus, in order to correspondingly control the orienting apparatus 26 on the basis of the parameters determined in this way. Here, at least one of the sensors may be an optical sensor and in particular a camera.

According to the invention, the orienting apparatus 26 has a first portion 28 and a second portion 30. In this case, the first portion 28 and the second portion 30 are arranged next to one another. In particular, the first portion 28 is arranged behind the second portion 30 in the direction of the first conveying direction 14. Different accelerations/braking actions are applied to the objects by the first portion 28 and the second portion 30, as a result of which an orientation of the objects 16 can be effected. At the same time, a braking and/or conveying/accelerating of the object can be effected by the first portion 28 and the second portion 30 of the orienting apparatus 26. Here, the following in particular applies the first portion has a first braking action and the second portion has a second acceleration;
the first portion has a first acceleration and the second portion has a second acceleration, the first acceleration being greater than the second acceleration; or
the first portion has a first braking action and the second portion has a second braking action, the first braking action being smaller than the second braking action.

Thus, the object 16 is rotated in accordance with arrow 24 on account of the different acceleration/braking of the object and the object 23 is rotated. Here, the braking action or the acceleration of the first portion 28 and/or of the second portion 30 is effected in the movement direction/conveying direction of the second conveying apparatus 18 and not in the movement direction/conveying direction of the first conveying apparatus 12. Thus, in the case that the second conveying apparatus 18 is configured as a chute, the gravitational movement along the chute and the braking action or acceleration of the first portion 28 and/or of the second portion 30 for orientation or rotation of the object 16 overlap.

In particular, a planar and in particular common conveying surface, over which the objects 16 are conveyed or slide, is formed by the first portion 28 and the second portion 30. It is thus possible for an object 16 which is moved via the first portion 28 and the second portion 30 to come into as full-area contact as possible with the first portion 28 and/or the second portion 30, such that the corresponding acceleration and/or braking action of the respective portion are effectively transmitted to the object 16. In this way, a desired rotation of the object 16 in accordance with the arrow 24 is achieved in a simple manner. In this regard, the object 16 is moved simultaneously via the first portion 28 and via the second portion 30 and comes into contact therewith, such that one part of the object 16 is subjected to the acceleration or braking action of the first portion 28 and another part of the object 16 is subjected to the acceleration or braking action of the second portion 30. In this way, different parts of the object 16 are accelerated/braked differently, which leads to the object being rotated and oriented.

Different embodiments of the present invention are illustrated below. In this case, identical or similar components have the same reference numbers. In particular, only the second conveying apparatus 18 is illustrated in FIGS. 2 to 9. Furthermore, the embodiments of FIGS. 1 to 9 may, where technically expedient, be combined with one another. By way of example, FIG. 9 shows a multiplicity of portions which can be freely combined with the embodiments of FIGS. 2 to 8. Furthermore, the second conveying apparatuses 18 in FIGS. 2 to 9 are always combined or combinable with a first conveying apparatus 12, shown in FIG. 1.

Figure 2:
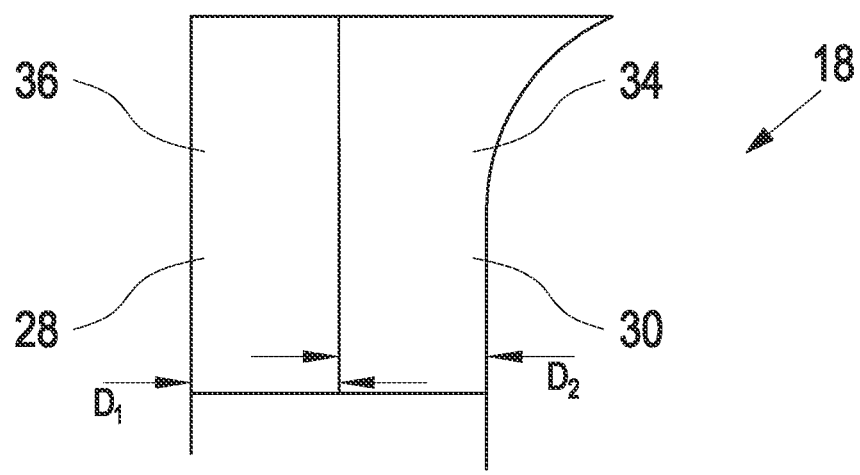
FIG. 2 shows one embodiment of the present invention.

FIG. 2 shows a second conveying apparatus 18 having a first portion 28 and a second portion 30. In this case, the first portion 28 is configured as a first sliding surface 36 and the second portion 30 is configured as a second sliding surface 34. The first sliding surface 36 and the second sliding surface 34 have different friction coefficients, with the result that a different braking action acts on the object when it slides over the sliding surfaces of the first portion 28 and of the second portion 30. The object is oriented on account of the different braking actions. The embodiment illustrated in FIG. 2 has the advantage that it can be of passive design, manages without movable parts and is thus of simple construction and low-maintenance form. Here, it is for example possible for the first portion 28 to have a lower friction than the second portion 30, such that a corresponding orientation, as shown in FIG. 1, is achieved.

Figure 3:
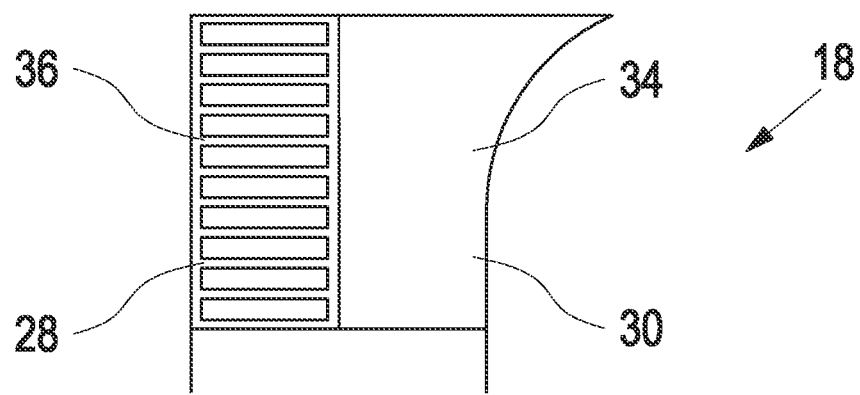
FIG. 3 shows a further embodiment of the present invention.

A second conveying apparatus 18 is shown in FIG. 3. In this case, the second portion is configured as a second sliding surface 34 as described in the case of FIG. 2. Furthermore, the first portion 28 is configured as a roller conveyor 36 having a multiplicity of conveying elements. In this case, the conveying elements may be configured as rollers or rolls, which are rotatably mounted, or as ball elements (configured for example as a roller conveyor), which are likewise rotatably mounted. In this case, the roller conveyor 36 may be active, i.e. be actuated/controlled, such that the conveying elements are actively moved in order to thus transmit an acceleration to the object 16. As an alternative, the roller conveyor 36 is a passive roller conveyor which is not actuated or which has no driven conveying elements. Here, the roller resistance of the roller conveyor 36 may be adapted, in order to transmit a suitable braking action to the object and in particular to generate a braking action which is selected in relation to the second portion 30 so as to achieve an optimal orientation of the object. Here, the roller resistance of the rollers of the roller conveyor 36 may be adapted for example by a braking element (based on friction, configured as an eddy-current brake or the like), or may for example be generated by a liquid filling of the individual roller elements. Furthermore, the surfaces of the roller elements may for example be formed by metal, in order to achieve an increased durability. As an alternative thereto, the surfaces of the roller elements may be formed by a plastic or rubber, in order to also achieve a braking action in the direction of the first conveying direction 14 and to thus avoid undesirably hard striking against the side wall 19 of the second conveying apparatus 18. In this case, the acceleration or braking action of the roller conveyor 36 may be selected on the basis of one or more of the parameters which have already been discussed above such as size of the object, weight of the object, position of the object on the first conveying apparatus and speed of the object on the first conveying apparatus. In this way, the braking action or the acceleration of the object in the first portion 28 can be freely selected.

Figure 4:
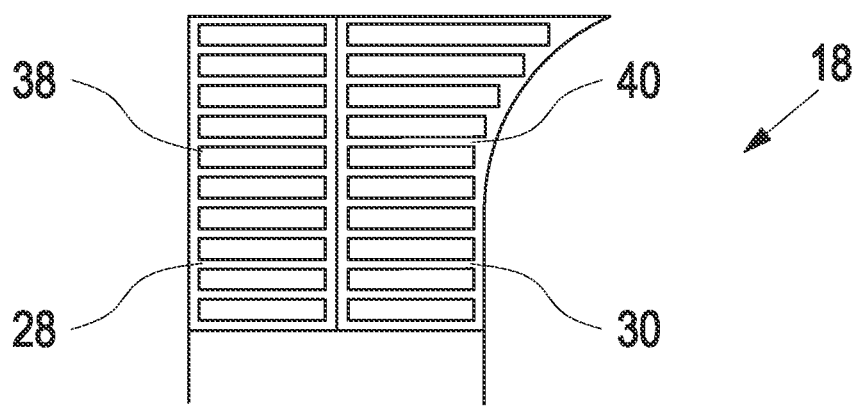
FIG. 4 shows a further embodiment of the present invention.

FIG. 4 shows a second conveying apparatus 18, wherein the first portion is configured as a first roller conveyor 38 as described in the case of FIG. 3. Equally, the second portion 30 is configured as a second roller conveyor 40. This may also be configured as described above in conjunction with FIG. 3. Here, the acceleration or braking action for the roller conveyor 40 of the second portion may also be selected on the basis of one or more of the parameters which have already been discussed above such as size of the object, weight of the object, position of the object on the first conveying apparatus and speed of the object on the first conveying apparatus.

Figure 5:
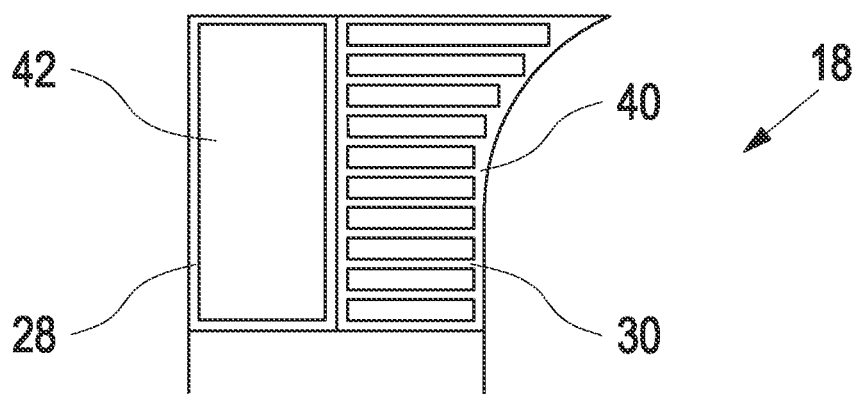
FIG. 5 shows a further embodiment of the present invention.

FIG. 5 shows a second conveying apparatus 18, wherein the second portion 30 is configured as a roller conveyor 40 as described in conjunction with FIGS. 3 and 4. In addition thereto, the first portion 28 is configured as a conveyor belt 42. The object is accelerated in a controlled manner by the conveyor belt 42 for orientation of the object by the orienting apparatus 26. Such an acceleration is effected if the conveying direction of the conveyor belt 42 is in the direction of the second conveying direction. Instead, the conveying direction of the conveyor belt 42 may be counter to the second conveying direction 20, such that effective braking of the object is effected. In particular, the acceleration or braking action of the conveyor belt 42 and/or of the roller conveyor 40 may be selected on the basis of one or more of the parameters which have already been discussed above such as size of the object, weight of the object, position of the object on the first conveying apparatus and speed of the object on the first conveying apparatus. In this way, the braking action or the acceleration of the object in the first portion 28 and in the second portion 30 can be freely selected.

Figure 6:
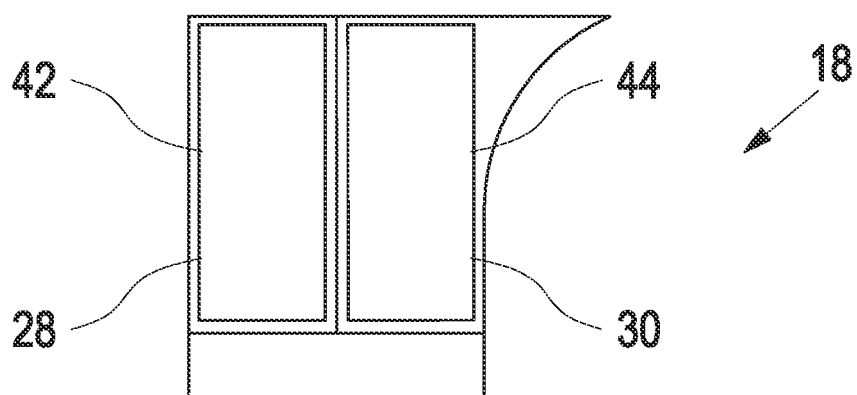
FIG. 6 shows a further embodiment of the present invention.

FIG. 6 shows a second conveying apparatus 18, wherein the first portion 28 is configured as a conveyor belt 42 as described in conjunction with FIG. 5. In addition, the second portion 30 is also configured as a second conveyor belt 44, which is movable independently of the conveyor belt 42 of the first portion 28. In particular, the conveying speeds of the first conveyor belt 42 and of the second conveyor belt 44 differ. In particular, the conveying directions of the first conveyor belt 42 and of the second conveyor belt 44 are opposed, in order to achieve an acceleration/braking of the object and thus an orientation of the object 16. In this case, the speeds of one or both conveyor belts 42, 44 may be selected on the basis of one or more of the parameters which have already been discussed above such as size of the object, weight of the object, position of the object on the first conveying apparatus and speed of the object on the first conveying apparatus. In this way, the braking action or the acceleration of the object in the first portion 28 and/or in the second portion 30 can be freely selected.

Figure 7:
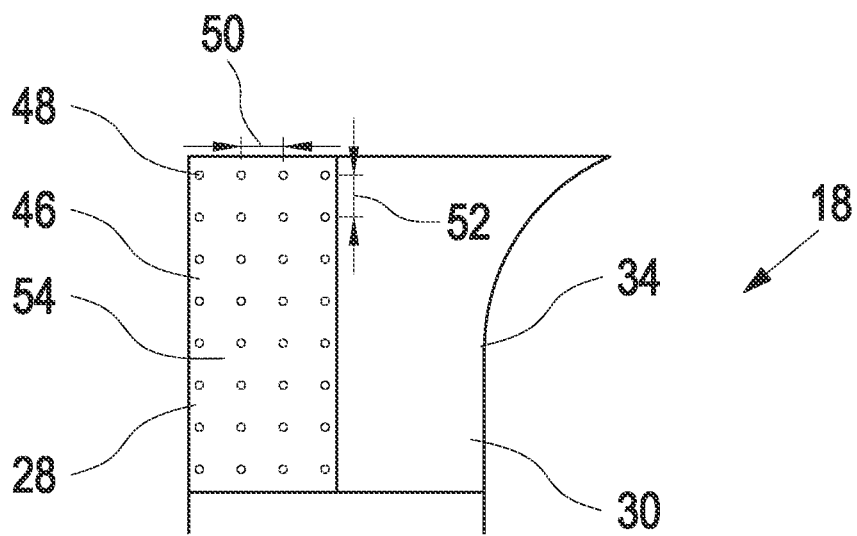
FIG. 7 shows a further embodiment of the present invention.

FIG. 7 shows a second conveying apparatus 18, wherein a second portion 30 is configured as a sliding surface 34 as described in conjunction with FIGS. 2 and 3. In addition thereto, the first portion 28 is configured as an aero surface 46. The aero surface 46 has a multiplicity of openings/nozzles 48. These have a spacing 50 in the transverse direction and a spacing 52 in the longitudinal direction. This spacing may be identical or different. In this case, a positive pressure may be applied to the opening 48, such that an air cushion is formed under the object 16 when the latter slides over the aero surface 46, as a result of which the friction between the object and the aero surface 46 is reduced. As an alternative thereto, a negative pressure is applied to the openings 48, such that the object 16 is pressed onto the surface of the aero surface, as a result of which the friction between the object and the aero surface 46 is increased. Effective braking is effected in this way. In particular, the braking action when a negative pressure is applied is higher than when a positive pressure is applied. In this case, a surface 54 of the aero surface 46 may be formed by a material with low friction. As an alternative thereto, the surface 54 of the aero surface 46 may be formed by a material with high friction such as rubber, as a result of which the braking action when a negative pressure is applied to the openings 48 is further increased. In particular, the openings 48 may be configured as nozzles which point in a conveying direction, as a result of which an acceleration is applied to the object on account of the direction of the nozzles. In this case, the positive pressure and/or negative pressure may be selected on the basis of one or more of the parameters which have already been discussed above such as size of the object, weight of the object, position of the object on the first conveying apparatus and speed of the object on the first conveying apparatus. In this way, the braking action or the acceleration of the object in the first portion 28 can be freely selected.

Figure 8:
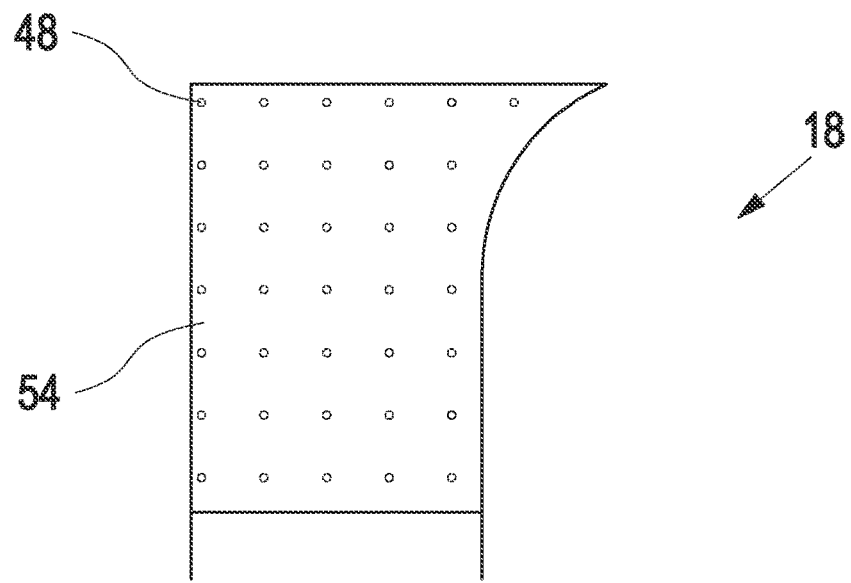
FIG. 8 shows a further embodiment of the present invention.
Figure 9:
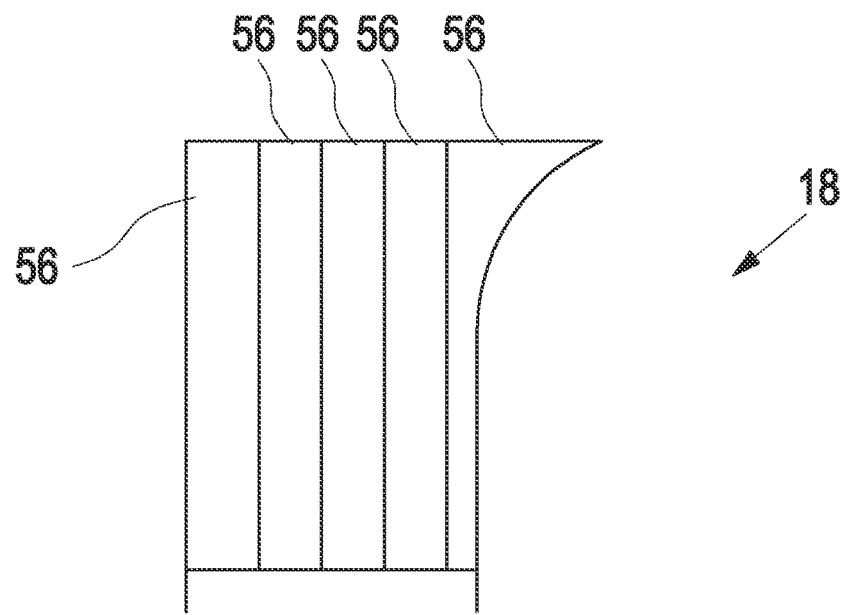
FIG. 9 shows a further embodiment of the present invention.

FIG. 8 shows a second conveying apparatus 18, wherein the orienting apparatus 26 in the first portion and in the second portion is configured as an aero surface 54 having a multiplicity of openings 48. In this case, a negative pressure/positive pressure may be applied to openings 48" in the first portion. Independently therefrom, a positive pressure/negative pressure may be applied to openings 48" in the second portion. In this way, a partial acceleration/braking of the object on the orienting apparatus 26 can be achieved, as a result of which an optimal orientation of the object 16 is obtained.

FIG. 9 shows a second conveying apparatus 18 having a multiplicity of portions 56. In this case, the portions may be configured as described above on the basis of FIGS. 2-8. In particular, different accelerations/braking actions are generated by each of the portions 56, such that the object is oriented in an optimal manner and rotated into the movement direction of the second conveying apparatus 18.

As has already been explained above, the individual embodiments of the first portion and/or of the second portion can be freely combined with one another. Furthermore, the different embodiments of the individual figures and in particular of FIGS. 1 and 9, together with FIGS. 2-8, can be freely combined with one another. Furthermore, it is possible for the orienting apparatus 26 to not extend over the entire width D of the second conveying apparatus 18, but rather to occupy only a part thereof. Although FIGS. 1-9 show that the orienting apparatus 26 extends in the direction of the second conveying direction 20 from directly at the beginning of the second conveying apparatus 18, a region in which the object is only moved in the direction of the second conveying direction 20 without already being oriented may initially be provided between the first conveying apparatus 12 and the orienting apparatus 26. As an alternative thereto, the orienting apparatus 26 may extend over the entire length of the second conveying apparatus 18 or be arranged at the end thereof. Furthermore, although FIGS. 1-8 show that the first portion and the second portion are of substantially the same size and are arranged in an unchanged manner relative to one another along the second conveying direction 20, this may be deviated from such that the first portion, the second portion or one of the multiplicity of portions 56 may be of different size. Furthermore, the width D1 (shown in FIG. 2) and/or the width D2 (shown in FIG. 2) of the respective first portion 28 and second portion 30, respectively, may vary along the second conveying apparatus 18, in order to obtain an optimal orientation.

Thus, the present invention provides an apparatus in which the objects to be conveyed are oriented. It is thus possible to avoid tilting of the objects during the transition from the first conveying apparatus to the second conveying apparatus. At the same time, the objects may be oriented in such a way that the second conveying apparatus can be of compact configuration, as a result of which the number of possible second conveying apparatuses can be increased in order to thus likewise increase the granularity of the sorting by the apparatus. This can also be effected for very different objects, which in particular have a very different weight and/or very different sizes and qualities. This makes it possible to avoid malfunctions of the apparatus. At the same time, taking account of the weight of the object, corresponding braking of heavy objects can be effected. This makes it possible to avoid damaging these heavy objects due to an excessively hard impact. By contrast, lightweight objects can be accelerated, as a result of which the object throughput rate of the apparatus can be increased.

The invention claimed is:

1. An apparatus for orienting or rotating objects, comprising
a conveying apparatus, wherein the conveying apparatus has an inlet for receiving the objects and an outlet and is configured to convey the objects in a conveying direction, and
wherein the conveying apparatus has an orienting apparatus which at least partially extends along the conveying direction,
wherein the orienting apparatus has a first portion and a second portion, wherein the first portion and the second portion are arranged next to one another along the conveying direction,
wherein at least one of the first portion and the second portion is configured as a roller conveyor, wherein the objects are subjected to a different acceleration/braking action by the first portion and the second portion for orientation or rotation purposes,
wherein the conveying apparatus is configured as a chute, wherein at the inlet of the conveying apparatus, the object has a movement component which is substantially perpendicular to the conveying direction of the conveying apparatus, and wherein the portion of higher acceleration/lower braking action is arranged behind the other portion along this movement component.

2. The apparatus according to claim 1, wherein the orienting apparatus is configured to orient the objects during continuous movement of the objects in the conveying direction.

3. The apparatus according to claim 1, wherein the roller conveyor has a drive for generating the acceleration/braking action.

4. The apparatus according to claim 1, wherein the roller conveyor has a braking apparatus, wherein the rolling resistance of the roller conveyor is changeable by means of the braking apparatus for the purpose of generating the braking action of the roller conveyor.

5. The apparatus according to claim 4, wherein the braking apparatus is configured to change the rolling resistance of the rolling conveyor by way of the weight of conveying elements of the roller conveyor, liquid filling of the conveying elements or a braking element.

6. The apparatus according to claim 1, wherein the orienting apparatus is configured to adapt the acceleration/braking action in dependence on one or more of the size of the object, the speed of the object, in particular at the inlet of the conveying apparatus, and the weight of the object.

7. The apparatus according to claim 1, wherein the first portion and the second portion are configured as a roller conveyor.

8. The apparatus according to claim 1, wherein the other of the first portion and the second portion is configured as a sliding surface, an aero surface or a conveyor belt.

9. The apparatus according to claim 1, wherein a plurality of portions are arranged next to one another, wherein at least one portion is configured as a first portion and one portion is configured as a second portion.

10. A sorter for sorting objects, in particular packages, comprising a first conveying apparatus and at least one second conveying apparatus which branches off from the first conveying apparatus, wherein the at least one second conveying apparatus is configured in accordance with the apparatus according to claim 1.

11. The sorter according to claim 10 comprising a multiplicity of second conveying apparatuses.

* * * * *